Patented Sept. 16, 1941

2,255,826

UNITED STATES PATENT OFFICE 2,255,826

PROCESS OF PROTECTING CORRODIBLE METAL SURFACE, AND PRODUCT RESULTING THEREFROM

John R. Skeen, Philadelphia, Pa., assignor to The United Gas Improvement Company, a corporation of Pennsylvania No Drawing. Application October 27, 1937, Serial No. 171,197

8 Claims. (Cl. 91—68)

This invention pertains generally to liquid coating compositions and pertains particularly to the class of substances generally known as paint. The invention pertains more particularly to paints that are subjected to severe service conditions.

The invention will be described in connection with service conditions met with by paints applied to gas holders. However, it is to be understood that the invention may be used for other purposes.

Paints applied to water-sealed gas holders meet with at least three different types of conditions in service, depending upon the portion of the holder under consideration.

For instance, paint applied to the crown is always subjected to atmospheric conditions such as sunlight, rain, wind, etc.; paint applied to the inside of the tank at and below the water line and to the inner surfaces of the cups is continuously immersed in water; whereas, paint applied to the sides of the lift or lifts is alternately subjected to immersion in water and to atmospheric conditions of which sunlight is the most important.

The paint applied to the lower part of the lift of a single lift holder and the paint applied to the lower lift or lifts of a multiple lift holder are often subjected to extreme immersion conditions for long periods of time, followed by exposure to sunlight.

Paint failure resulting from immersion in water is due, among other things, to seepage of water through the paint film causing blisters and corrosion between the paint film and the surface to which the paint is intended to adhere. The latter is particularly true of metallic surfaces and especially of iron and steel surfaces. The migration through the paint film of oxygen contained in the water is also a principal factor since this tends to cause cracking, checking, and/or alligatoring.

Failure of certain paints, such as bituminous paints, where exposed to the atmosphere, is caused primarily by sunlight and particularly by ultraviolet bands as well as by the migration of atmospheric oxygen through the paint film. The result is cracking, checking and/or alligatoring of the paint.

This becomes of extreme importance on those surfaces which are continuously or alternately immersed because cracks, checks and decreasing thickness at alligator lines decrease resistance to water seepage and lower the impedance of the film generally.

It is common experience that paint films which are continuously immersed or immersed for long periods of time have a very short useful life.

In accordance with my invention these difficulties are materially overcome by the use of a primer coat or coats comprising a supercooled liquid over which is applied a suitable top coat or coats to be hereinafter more particularly described.

A supercooled liquid might be defined as a substance which partakes of some of the characteristics of a solid such as rigidity, but lacks certain other essential characteristics of solid substances such as a definite melting point. The rigid or semi-rigid character of a supercooled liquid is attributed to high viscosity rather than to solidification.

A paint film resulting from the use of a pitch paint is an example of a supercooled liquid, provided the film is not permitted to solidify such as by polymerization or oxidation or both.

It is my experience that liquid primer coats will not blister as rapidly as solid or elastic primer coats.

I find further that I can very materially decrease the seepage of water and migration of oxygen through my liquid primer coat by adding thereto a discoid filler such as mica, finely divided or flaked aluminum, flaked lead, or the like, the function of which is to impede migration of water and oxygen by forming a vast number of tortuous paths through which the water and oxygen must travel before it can cause material damage.

In addition to impeding the migration of water and oxygen, the discoid filler (1) improves the body, pull and slip of the paint; (2) permits application of a top coat after a shorter drying interval; (3) toughens the film markedly on drying; (4) increases the adhesion of the film to the metal surface even after prolonged immersion; and (5) retards embrittlement of the film on immersion.

I find further that the prevention or retardation of polymerization (which is largely responsible for cracking, checking and alligatoring) through the addition of alpha-naphthylamine greatly adds to the useful life of the paint. In fact, in the case of alpha-naphthylamine, as distinguished from a large number of other inhibitors, the life of the paint appears to be extended almost indefinitely. Alpha-naphthylamine acts to inhibit polymerization both in sunlight and upon immersion. The latter is particularly important. Very few if any other inhibitors have this double-acting quality.

The discoid filler above referred to not only functions to prevent rapid penetration of water and oxygen through the paint film but also greatly retards loss of alpha-napthylamine which is water soluble. It also functions to greatly retard or prevent bleeding of the liquid primer coat into the top coat as will hereinafter appear.

For my liquid primer coat I prefer to use a pitch paint, for instance, paints made with petroleum or coal tar pitch, although, generally speaking, any other bituminous paint might be employed.

While the softening point of the pitch used in making the paint may vary considerably, depending upon the results desired, I prefer to have the softening point between approximately 140 and 165° F. so that the resultant film will not be too brittle at ordinary temperatures and will not be too fluid at higher temperatures. A softening point between 150 and 155° F. is very satisfactory.

The following will illustrate a manner in which a pitch paint for the primer coat may be made up. Table I shows proportions and ingredients which may be varied, consistent with good paint practice, to retain desired qualities such as body, brushability, slip, etc.

TABLE 1

*Materials for 68 gallons*

| Ingredient | Mass in pounds | Percent by weight | Percent by weight without thinner |
|---|---|---|---|
| Pitch | 413.00 | 50.0 | 64.9 |
| Alpha-naphthylamine | 21.25 | 2.6 | 3.3 |
| Mica | 73.75 | 8.9 | 11.5 |
| Flaked lead | 116.25 | 14.0 | 18.1 |
| Asbestos | 13.75 | 1.6 | 2.2 |
| Thinner | 189.20 | 22.9 | |
| Total | 827.20 | 100.0 | 100.0 |

Generally speaking, the asbestos is added to avoid or reduce "curtaining." The mica is added not only because of its discoid character but also because it imparts a desired slip due to its lubricating properties.

Mica also distributes or disperses itself throughout the mass more uniformly than aluminum or flaked lead, since both aluminum and flaked lead tend to "leaf," that is, concentrate at the surface. I prefer to have present in my paint both types of discoid fillers.

For the purposes of the claims the former type of discoid filler will be referred to as "dispersing discoid filler" and the latter type as "leafing discoid filler."

The following is an example of how the ingredients of the above formula might be mixed.

A steam jacketed mixing vat with a capacity of 100 gallons and having a slowly revolving mixing rotor is employed.

The pitch is broken into small pieces placed in the vat and melted. After melting the temperature is held at between 200 and 212° F. Five gallons of the thinner, which may be naphtha, are then added together with the alpha-naphthylamine which is dissolved in the thinner. The mix is then cooled to room temperature with continued agitation whereupon five additional gallons of thinner are added followed by the asbestos. Mixing is continued for about fifteen minutes whereupon the mica is added. After fifteen minutes of additional agitation the balance of the thinner and the flaked lead are added. A stick is used to assist in breaking up the lumps of flaked lead. Mixing is continued for an additional four hours whereupon the paint is ready for use.

Table 2 shows proportions and ingredients of another example.

TABLE 2

| Ingredient | Percent by weight |
|---|---|
| Pitch | 42.1 |
| Wax oil | 3.6 |
| Tung oil | 1.2 |
| Alpha-naphthylamine | 2.2 |
| Asbestos | 1.5 |
| Kaolin | 14.0 |
| Slate flour | 13.3 |
| Thinner (heavy naphtha) | 22.1 |
| Total | 100.0 |

The viscosity will be approximately 14 to 15 seconds Gardner.

Generally speaking, the composition may vary over a wide range consistent with good paint practice. This is illustrated by way of example in the following table.

TABLE 3

| Ingredient | Percent by weight |
|---|---|
| Pitch | 62 to 68 |
| Alpha-naphthylamine | 3.0 and above |
| Mica | 7.8 to 13 |
| Flaked lead | 13 to 20 |
| Asbestos | 0 to 2.5 |
| Total | 100 |

Thinner is added to obtain the desired viscosity which is usually between 22 and 38 seconds Gardner, and the ingredients may be mixed in any manner and by any means known in the art.

While broadly speaking the liquid primer coat may be of any desired thickness without departing from the spirit of the invention, I find that the life of the paint will be greatly increased if a certain minimum thickness is exceeded. For instance, the resultant primer coat will be highly resistant to the effects of immersion, alternate or otherwise, if one gallon of paint is not made to cover more than say 450 square feet with approximately 400 square feet as a good average limit.

The term "liquid primer coat" is used here to signify the total primer film whether built up by one or more applications. A film of this preferred thickness may be readily built up in a single application.

The paint may be applied in any suitable manner, for instance, with a brush.

I find that changes in temperature and particularly high summer temperatures tend to cause the liquid primer coat to flow and wrinkle and then develop stresses on cooling. I have discovered that I may overcome this by applying a rigid top coat over the liquid primer coat such as that afforded by a standard aluminum paint. This holds the liquid primer coat in place regardless of its fluid character. The tortuous paths furnished by the discoid filler and particularly the concentration of filler at the surface commonly as leafing, such as takes place with aluminum or flaked lead for instance, prevents the liquid primer coat from bleeding into and discoloring the top coat.

On the other hand, there are conditions under which I may prefer to use as a top coat one or more applications of the paint used for the primer coat. For instance, if the painted surface is not exposed to the sun I may not need the rigid top coat to hold the liquid primer coat in place, nor the capacity and reflecting power of this top coat to decrease transmission of ultra violet light to the primer coat where it would cause polymerization.

A top coat or coats of a rigid character such as that afforded by an aluminum paint will hold the liquid primer coat in place, regardless of ordinary temperature conditions, and it is found that the resultant paint job has a much longer useful life than results from the use of elastic films as top coats. Elastic films result from the use of the ordinary red or black paints.

However, even when elastic top coats are used, the superior character of the primer coat materially extends the useful life of the paint job.

Any other suitable rigid top coat may be substituted for that afforded by an aluminum paint. For instance, flaked lead may be substituted for aluminum in the top coat paints. This will result in a rigid top coat of a superior character.

In choosing a top coat to be used over my primer coat, for best results consideration should be given to the following:

(1) Its capacity to resist transmission of ultraviolet light.

(2) Its capacity to resist transmission of oxygen.

(3) Its capacity to resist solution of alpha-naphthylamine from the primer coat when the painted surface is immersed in water.

(4) Its capacity to wet and adhere to the primer coat.

(5) Its capacity to dry quickly to prevent possible distortion of the primer coat by flowing.

(6) Its capacity to resist solution or transmission of discoloring materials from the primer coat.

(7) Its capacity to meet ordinary good paint specifications.

It is found that standard aluminum paints and particularly those of good quality meet the above specifications and in addition provide the rigid film above referred to.

A top coat of the same material as the primer coat oddly enough meets practically all of the above specifications. This is because its discoid filler resists transmission of ultraviolet light, oxygen and water, even though it itself would be attacked; being of the same material it will wet and strongly adhere to the primer coat; it will dry quickly and thus prevent flow during drying even though it will not prevent flow of the primer coat after drying; it is of the same color as the primer coat so that discoloration is no factor, although its discoid filler would prevent bleeding to the surface if it were of a different color; and it can be readily made to meet good paint specifications.

With respect to other types of paints such as those which result in elastic top coat films of which the ordinary red and black paints are examples, it is found that these will be generally more or less suitable if their vehicles are quick drying and composed of tung or linseed oils in which has been incorporated resins such as those of the phenol-formaldehyde type.

Suitable top coats meeting the above specifications will suggest themselves to persons skilled in the art upon becoming familiar with this invention.

I find that my new paint films are not only highly resistant to extreme immersion conditions but are also highly alkali resisting. They are, therefore, admirably suited for use along with my treatment of holder water to prevent holder discoloration and corrosion as described and claimed in my copending application Serial Number 168,911 filed October 14, 1937, which has matured into Patent Number 2,141,049, Nov. 22, 1938.

The term "comprising" unless otherwise qualified is used in the claims in its usually accepted meaning which does not exclude other steps or the presence of substances other than those specifically recited.

Having particularly described my invention, it is to be understood that this is by way of illustration and that changes, omissions, additions, substitutions and/or modifications might be made within the scope of the claims without departing from the spirit of the invention which is intended to be limited only as required by the prior art.

I claim:

1. A process for protecting the outer surface of a corrodible metal lift of a water-sealed gas holder, comprising applying directly to said surface a paint comprising pitch having a softening point between 140 and 165° F. 62 to 68%, alpha-naphthylamine at least 3%, dispersing discoid filler 7.8 to 13%, leafing discoid filler 13 to 20%, and asbestos up to 2.5%, thus making a total of 100%, said paint having in addition sufficient thinner to impart to said paint a viscosity between 22 and 38 seconds Gardner, said application of said paint being such that one gallon of paint having the above mentioned viscosity is made to cover not more than 450 square feet of surface, and after sufficient drying of the primer coat thus formed applying to said primer coat a rigid top coat to hold said primer coat in place during extreme weather conditions.

2. A process for protecting the outer surface of a corrodible metal lift of a water-sealed gas holder, comprising applying directly to said surface a paint having a composition without thinner of the order of the following: pitch having a softening point between 140 and 165° F. 64.9%, alpha-naphthylamine 3.3%, mica 11.5%, flaked lead 18.1%, and asbestos 2.2%, said paint with thinner having a viscosity between 22 and 38 seconds Gardner, said application of said paint being such that one gallon of paint with thinner is made to cover not more than 400 square feet of surface, and after sufficient drying of the primer coat thus formed applying to said primer coat a rigid top coat.

3. A corrodible metal lift of a water-sealed gas holder having applied to the outer surface thereof a primer coat comprising from 62 to 68% pitch having a softening point between 140 and 165° F., at least 3% alpha-naphthylamine, from 7.8 to 13% mica, from 13 to 20% flaked lead, and from 0 to 2.5% asbestos, the sum of the foregoing percentages making at least substantially 100%, and a rigid aluminum top coat applied over said primer coat.

4. A process for protecting the outer surface of a corrodible metal lift of a water-sealed gas holder, comprising applying to said surface a primer coat comprising pitch, a discoid filler, and sufficient alpha-naphthylamine to substantially reduce polymerization of said pitch both when submerged in water and when exposed to sunlight, and applying over said liquid primer coat a top coat having a vehicle which is quick drying, which contains resin of the phenol-formaldehyde type, and which comprises one of a group consisting of tung oil and linseed oil.

5. A corrodible metal surface adapted for submersion in oxygen-containing water for long periods of time, said surface having applied thereto a paint film comprising from 62% to 68% pitch having a softening point between 140 and 165° F., at least 3% alpha-naphthylamine, from 7.8% to 13% dispersing discoid filler, from 13% to 20% leafing discoid filler, and from 0 to 2.5% asbestos.

6. A process for adapting a corrodible metal surface for submersion in oxygen-containing water for long periods of time and to alternate and to random submersion in water and exposure to the elements, comprising applying to said surface a primer coat comprising on a thinner free basis from 62% to 68% pitch having a softening point between 140° F. and 165° F., at least 3% alphanaphthylamine, from 7.8% to 13% dispersing discoid filler, from 13% to 20% leafing discoid filler, and from 0% to 2.5% asbestos.

7. A process for adapting a corrodible metal surface for submersion in oxygen-containing water for long periods of time and to alternate and to random submersion in water and exposure to the elements, comprising applying to said surface a primer coat comprising on a thinner free basis from 62% to 68% pitch having a softening point between 140° F. and 165° F., at least 3% alphanaphthylamine, from 7.8% to 13% dispersing discoid filler, from 13% to 20% leafing discoid filler, and from 0% to 2.5% asbestos, and applying over said primer coat a top coat which is rigid to hold said primer coat in place during warm atmospheric temperatures.

8. A corrodible metal surface adapted for submersion in oxygen-containing water for long periods of time and to alternate and to random submersion in water and exposure to the elements, said surface having applied thereto a primer coat comprising from 62% to 68% pitch having a softening point between 140° F. and 165° F., at least 3% alphanaphthylamine, from 7.8% to 13% dispersing discoid filler, from 13% to 20% leafing discoid filler, and from 0% to 2.5% asbestos, and a top coat applied over and adhering to said primer coat, said top coat being rigid to hold said primer coat in place during warm atmospheric temperatures.

JOHN R. SKEEN.